US008482942B2

(12) United States Patent  
Choi

(10) Patent No.: US 8,482,942 B2  
(45) Date of Patent: Jul. 9, 2013

(54) METHOD AND APPARATUS FOR BRIDGELESS POWER FACTOR CORRECTION

(75) Inventor: Hangseok Choi, Bedford, NH (US)

(73) Assignee: Fairchild Semiconductor Corporation, San Jose, CA (US)

(*) Notice: Subject to any disclaimer, the term of this patent is extended or adjusted under 35 U.S.C. 154(b) by 356 days.

(21) Appl. No.: 12/869,416

(22) Filed: Aug. 26, 2010

(65) Prior Publication Data

US 2012/0051107 A1 Mar. 1, 2012

(51) Int. Cl.
*H02M 5/45* (2006.01)
*H02M 7/00* (2006.01)

(52) U.S. Cl.
USPC .............................. 363/37; 363/125

(58) Field of Classification Search
USPC .............................. 363/37, 125, 126, 174, 74
See application file for complete search history.

(56) References Cited

U.S. PATENT DOCUMENTS

| 4,942,509 | A | | 7/1990 | Shires et al. | |
|---|---|---|---|---|---|
| 5,278,490 | A | | 1/1994 | Smedley | |
| 5,867,379 | A | * | 2/1999 | Maksimovic et al. | 363/89 |
| 5,886,586 | A | | 3/1999 | Lai et al. | |
| 7,068,016 | B2 | | 6/2006 | Athari | |
| 7,196,435 | B2 | * | 3/2007 | Kugelman et al. | 307/141.8 |
| 2011/0038188 | A1 | * | 2/2011 | Choi | 363/74 |
| 2011/0075462 | A1 | * | 3/2011 | Wildash | 363/127 |

FOREIGN PATENT DOCUMENTS

| CN | 102386759 A | 3/2012 |
|---|---|---|
| KR | 1020120020080 A | 3/2012 |
| TW | 201222193 A | 6/2012 |

OTHER PUBLICATIONS

Brown, R., et al., "PFC Converter Design with IR1150 One Cycle Control IC", International Rectifier Technical Assistance Center, Application Note AN-1077, Rev.2.1, (Mar. 2005), pp. 1-18.
Brown, Ron, et al., "One Cycle Control IC Simplifies PFC Designs", International Rectifier, As presented at APEC 05, (2005), 5 pgs.
Infineon Technologies AG, "Preliminary Data, Standalone Power Factor Correction (PFC) Controller in Continuous Conduction Mode (CCM) at Fixed Frequency 65kHz", Edition Sep. 7, 2004, Infineon Technologies AG, http://www.infineon.com, (Sep. 7, 2004), 18 pgs.
Lu, Bing, et al., "Bridgeless PFC Implementation Using One Cycle Control Technique", Internal Rectifier, As presented at APEC '05, (2005), 6 pgs.

(Continued)

*Primary Examiner* — Adolf Berhane
*Assistant Examiner* — Emily Pham
(74) *Attorney, Agent, or Firm* — Schwegman Lundberg Woessner P.A.

(57) ABSTRACT

This document discusses, among other things, an improved bridgeless power factor correction (PFC) circuit. In an example, the PFC circuit can include a first switch and a control circuit, the control circuit configured to provide a switching cycle, to generate a carrier signal corresponding to the switching cycle, and to generate a control signal for the first switch during the switching cycle. In an example, the control circuit can receive a first signal indicative of current through the first switch and generate a duty cycle for the first switch using a comparison of the first signal and the carrier signal. In an example, the control circuit can initiate the carrier signal at the beginning of the switching cycle and provide a carrier signal duration corresponding to a fraction of a duration of the switching cycle of the PFC circuit (e.g., one-half, one-third, etc.).

19 Claims, 4 Drawing Sheets

OTHER PUBLICATIONS

Semiconductor Components Industr, "Compact, Fixed-Frequency, Continuous Conduction Mode PFC Controller", NCP1653, NCP1653A, Rev. 6, (Mar. 2007).

Texas Instruments, "8-Pin Continuous Conduction Mode (CCM) PFC Controller, UCC28019", (Apr. 2007).

* cited by examiner

METHOD AND APPARATUS FOR BRIDGELESS POWER FACTOR CORRECTION

BACKGROUND

The power factor of an AC electrical power system is defined as the ratio of real power flowing to a load to the apparent power. For example, the power factor of an AC electrical power system having sinusoidal current and voltage waveforms is the cosine of the phase angle between the current and voltage waveforms. The power factor of an AC electrical power system having a non-sinusoidal current or voltage waveform consists of several factors, including the displacement factor related to the phase angle, and the distortion factor related to the non-sinusoidal wave shape.

Generally, real power (e.g., watts) can be defined as the power that produces real work, reactive power can be defined as the power required to produce the magnetic fields (e.g., lost power) to enable real work to be done, and apparent power can be defined as the total power required to produce the desired real power. The power factor of an AC electrical power system can vary between 0 and 1, with 1 representing a purely resistive circuit having no reactive power loss. When the power factor of the AC electrical power system is not 1, the current waveform does not follow the voltage waveform, resulting in not only power losses, but also potentially causing harmonics that travel through the AC electrical power system, potentially disrupting other devices.

Accordingly, power factor correction (PFC) circuits can be used to increase the power factor of an AC electrical power system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

OVERVIEW

Figure 1:
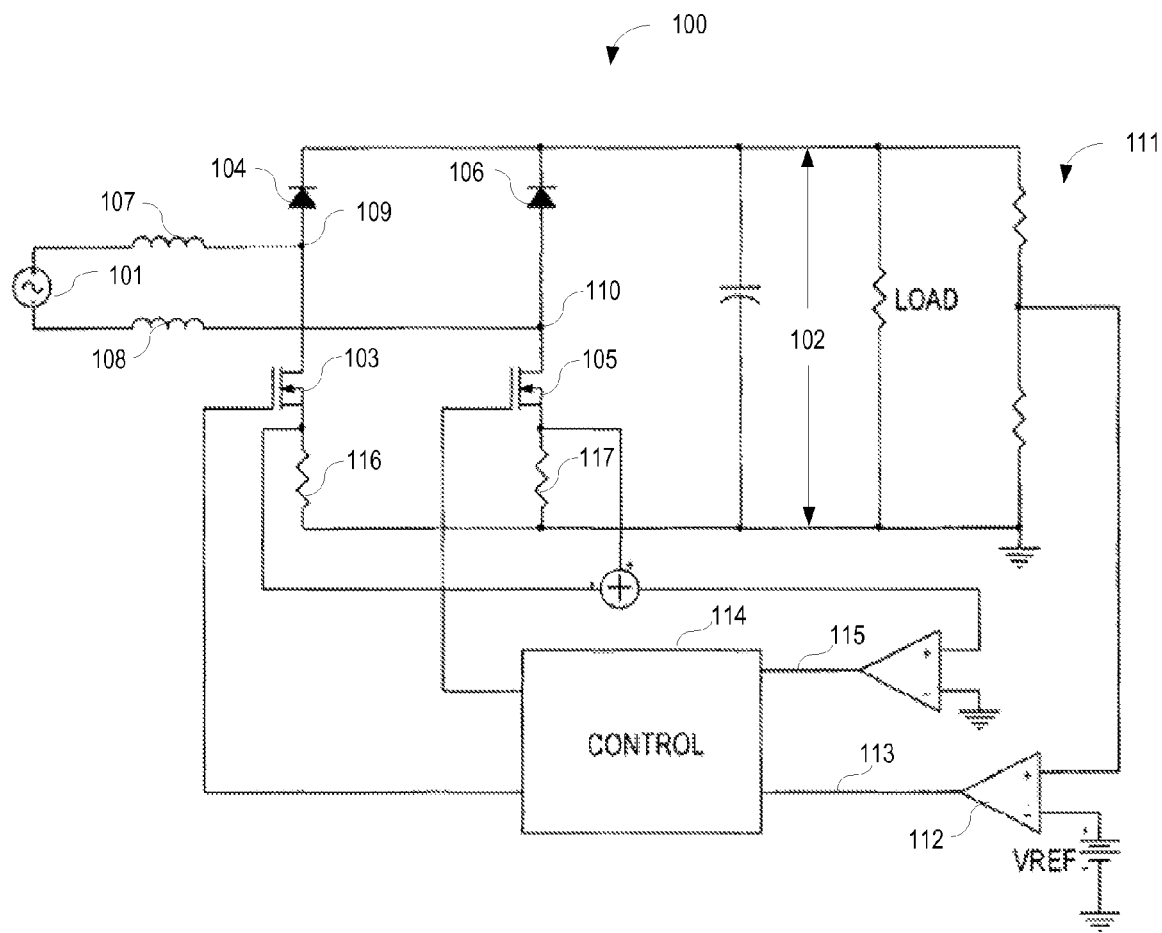
FIG. 1 illustrates generally a prior art bridgeless PFC circuit.

The present inventors have recognized, among other things, an improved bridgeless power factor correction (PFC) circuit. In an example, the PFC circuit can include a first switch and a control circuit, the control circuit configured to provide a switching cycle, to generate a carrier signal corresponding to the switching cycle, and to generate a control signal for the first switch during the switching cycle. In an example, the control circuit can receive a first signal indicative of current through the first switch and generate a duty cycle for the first switch using a comparison of the first signal and the carrier signal. In an example, the control circuit can initiate the carrier signal at the beginning of the switching cycle and provide a carrier signal duration corresponding to a fraction of a duration of the switching cycle of the PFC circuit (e.g., one-half, one-third, etc.).

In a first example, Example 1, a bridgeless power factor correction circuit configured to couple to an alternating current source and a direct current load, the circuit can include a first switch, a control circuit configured to provide a switching cycle, to generate a carrier signal as a function of the switching cycle, and to generate a control signal for the first switch during the switching cycle, wherein the control circuit is configured to receive a first signal indicative of current through the first switch, and to generate an duty cycle for the first switch using a comparison of the first signal and the carrier signal, and wherein the control circuit is configured to initiate the carrier signal at the beginning of the switching cycle, and wherein a carrier signal duration corresponds to a fraction of a duration of the switching cycle.

In Example 2, the carrier signal of Example 1 is optionally configured to decrease from a first voltage to second voltage during the carrier signal duration.

In Example 3, the first signal of any one or more of Examples 1-2 optionally include a voltage indicative of the current through the first switch.

In Example 4, the control circuit of any one or more of Examples 1-3 is optionally configured to generate the control signal for the first switch, the control signal including a duty cycle for the first switch, the duty cycle determined using a time at which the carrier signal crosses the first signal.

In Example 5, a fraction of the duty cycle for the first switch of any one or more of Examples 1-4 is optionally an interval from the beginning of the switching cycle to the time at which the carrier signal crosses the first signal.

In Example 6, any one or more of Examples 1-5 optionally a pulse extender configured to provide the duty cycle for the first switch using the interval.

In Example 7, the carrier signal duration of any one or more of Examples 1-6 optionally corresponds to one half of the switching cycle.

In Example 8, the control circuit of any one or more of Examples 1-7 is optionally configured to generate the control signal for the first switch, the control signal including a duty cycle for the first switch, the duty cycle determined using a time at which the carrier signal crosses the first signal.

In Example 9, one half of the duty cycle for the first switch of any one or more of Examples 1-8 is optionally an interval from the beginning of the switching cycle to the time at which the carrier signal crosses the first signal.

In Example 10, any one or more of Examples 1-9 optionally includes a pulse extender configured to double the interval to provide the duty cycle for the first switch.

In Example 11, any one or more of Examples 1-10 optionally includes an opto-coupler circuit to sense a polarity state of the AC source, the opto-coupler circuit further configured to selectively couple an output of the control circuit to a control input of the first switch based on the sensed polarity state.

In Example 12, a method to improve power factor correction using a bridgeless power factor correction circuit, the method including generating a switching cycle of the power factor correction circuit, generating a carrier signal to initially turn on a first switch of the bridgeless power factor correction circuit, wherein generating the carrier signal includes initiating a ramp of the carrier signal at a first voltage related to a difference between a DC output voltage of the bridgeless power factor correction circuit and a first reference voltage, and ramping the carrier signal to a second reference voltage over a first interval, the first interval equivalent to a fraction of the switching cycle of the power factor correction circuit. The method further includes initiating current conduction through the first switch of the power factor correction circuit using a comparison of the carrier signal and a voltage indicative of the current conduction, sensing a first switch interval from the initiation of the current conduction to a time when the carrier signal equals the voltage indicative of the current conduction, and terminating the current conduction through the first switch after a second switch interval, the second switch interval measured from the initiation the current conduction, wherein the second switch interval is a multiple of the first switch interval, and wherein the multiple is related to the fraction of the switching cycle.

In Example 13, the ramping the carrier signal of any one or more of Examples 1-12 optionally includes ramping the carrier signal to a second reference voltage over a first interval, the first interval equivalent to about one half of the switching cycle of the power factor correction circuit.

In Example 14, the terminating the current conduction through the first switch of any one or more of Examples 1-13 optionally includes terminating the current conduction through the first switch after the second switch interval, wherein the second switch interval measured from the initiation the current conduction, and wherein the second switch interval is twice as long as the first switch interval.

In Example 15, the initiating current conduction through the first switch of any one or more of Examples 1-14 optionally includes determining a first polarity state of an AC source coupled to the power factor correction circuit.

In Example 16, any one or more of Examples 1-15 optionally includes initiating current conduction through a second switch of the power factor correction circuit using a comparison of the carrier signal and the voltage indicative of the current conduction through the second switch, sensing a third switch interval from the initiation of the current conduction through the second switch to a time when the carrier signal equals the voltage indicative of the current conduction through the second switch, and terminating the current conduction through the second switch after a fourth switch interval, wherein the fourth switch interval measured from the initiation of the current conduction through the second switch, and wherein the fourth switch interval is the multiple of the third switch interval.

In Example 17, the ramping the carrier signal of any one or more of Examples 1-16 includes ramping the carrier signal to a second reference voltage over a first interval, the first interval equivalent to about one half of the switching cycle of the power factor correction circuit.

In Example 18, the terminating the current conduction through the second switch of any one or more of Examples 1-17 optionally includes terminating the current conduction through the second switch after a fourth switch interval, wherein the fourth switch interval is measured from the initiation the current conduction through the second switch, and wherein the fourth switch interval is twice as long as the third switch interval.

In Example 19, the initiating current conduction through the first switch of any one or more of Examples 1-18 optionally includes determining a first polarity state of an AC source coupled to the power factor correction circuit.

In Example 20, the initiating current conduction through the second switch of any one or more of Examples 1-19 optionally includes determining a second polarity state of the AC source coupled to the power factor correction circuit.

This overview is intended to provide an overview of subject matter of the present patent application. It is not intended to provide an exclusive or exhaustive explanation of the invention. The detailed description is included to provide further information about the present patent application.

DETAILED DESCRIPTION

The present subject matter includes apparatus and methods for improved power factor correction (PFC) and lower total harmonic distortion of a bridgeless PFC, even when the bridgeless PFC includes small inductance values.

FIG. 1 illustrates generally a prior art bridgeless PFC circuit 100. The bridgeless PFC circuit 100 is coupled to an AC source 101 and provides a DC output 102. The bridgeless PFC circuit 100 includes a first switch 103 and first diode 104 coupled in series between the positive and negative rails of the DC output 102, and a second switch 105 and second diode 106 coupled in series between the positive and negative rails of the DC output 102. The AC source 101 is coupled through first and second inductors 107, 108 to respective first and second junctions 109, 110 between each pair of the first switch 103 and the first diode 104 and the second switch 105 and the second diode 106. The bridgeless PFC circuit 100 includes a voltage divider 111 and a comparator 112 configured to provide an output voltage error signal 113 to a controller 114 of the bridgeless PFC circuit 100. Further, the controller 114 receives a current sense voltage 115 derived from first and second sampling resistors 116, 117 coupled, respectively, to the first and second switches 103, 105.

The bridgeless PFC circuit 100 is configured to initiate current flow in the first and second inductors 107, 108 using one of the first or second switches 103, 105, and then to redirect the current flow to the load using the body diode of the other switch. In an example, the duty cycle of one of the first or second switches 103, 105 can shape the current waveform such that near unity power factor can be maintained at the input of the circuit. Unity power factor is established when the current waveform is in phase and the same shape as the input voltage waveform.

Figure 2A:
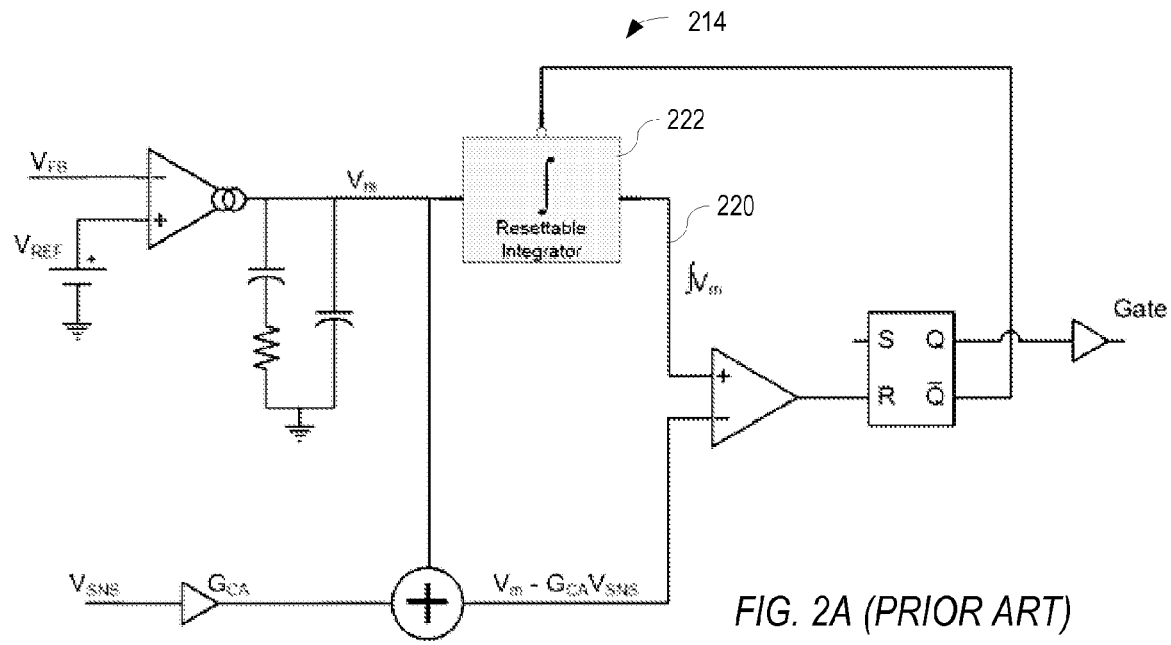
FIG. 2A illustrates generally a control scheme for an existing bridgeless PFC circuit.
Figure 2B:
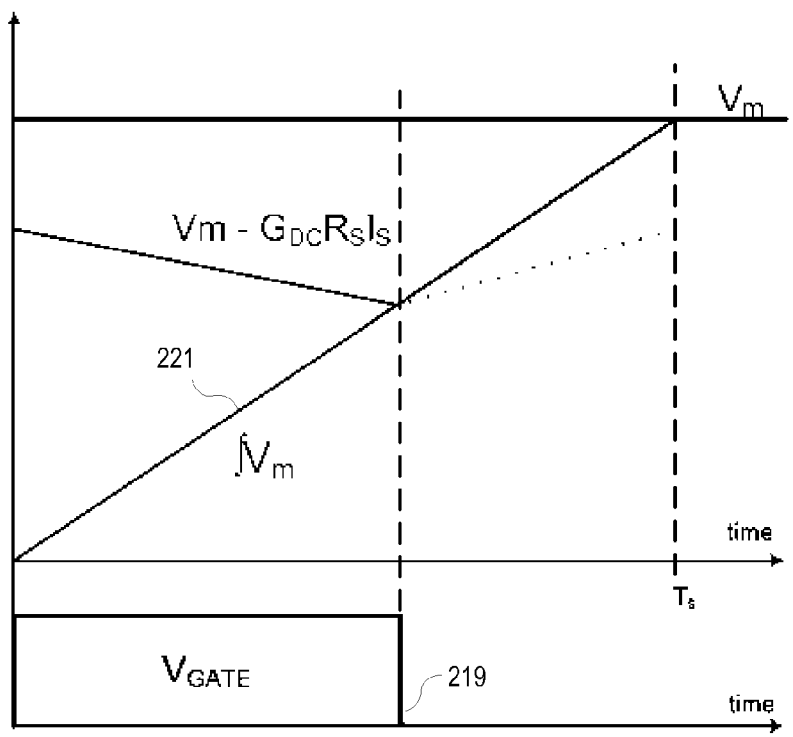
FIG. 2B illustrates generally a gate control pulse generated using the control scheme of FIG. 2A.

FIG. 2A illustrates generally a prior art control scheme 214 for a bridgeless PFC circuit. FIG. 2B illustrates generally a gate control pulse 219 generated using the control scheme of FIG. 2A. The control scheme 214 includes a resettable integrated carrier signal $(\int V_m)$ 220. The carrier signal ramp 221 of an integrator 222 is influenced by an error $(V_{FB})$ of the output voltage of the PFC circuit. The carrier signal ramp 221 increases from zero to a reference voltage $V_m$ during the switching cycle $(T_s)$. Further, the period of the carrier signal ramp 221 spans the entire switching cycle $(T_s)$ of the PFC control circuit. In the illustrated control scheme, the inductor current of the bridgeless PFC circuit is sensed using the conduction current of the switches and is represented as a voltage $V_{SNS}$, where $V_{SNS}=G_{DC}R_sI_s$, where $R_s$ is a sensing resistor (e.g., first resistor 116, second resistor 117, etc.), $I_s$ is the current passing through the sensing resistor $R_s$ and $G_{DC}$ is the sensing gain.

The shape of the input current waveform is estimated by controlling the peak current of the inductors at each switching interval according to the shape of the input voltage waveform. Control of the peak current of the inductors can be estimated by controlling the duty cycle of the first and second switches. The duty cycle of the first and second switches can be determined from a comparison of the conduction current of the first and second switches (e.g. $V_m-G_{Dc}R_sI_s$) and the resettable integrated carrier signal $(\int V_m)$ 220 described above. Unity power factor can be substantially accomplished when the average inductor current is proportional to and in phase with the input voltage waveform.

Inductor current is sensed using the conduction current of the first and second switches in the bridgeless PFC circuit. The duty cycle of one of the first or second switches in the example of FIG. 1 can control the peak current of the switching cycle. As a result, the shape of the peak inductor current waveform can be proportional to and in phase with the input voltage waveform. Therefore, as long as the inductor current has a very small ripple such that the peak of inductor current is almost same as the average of inductor current, this control applied to a sinusoidal line voltage results in unity power factor. However, small ripple current requires very large inductor, which is practically impossible in real application due to the size and cost constraint.

In real application, the inductor current always has some amount of ripple and this makes the average inductor current different from peak inductor current. So, the control technique of the prior art causes line current distorted and this distortion limits the ability of the control scheme 214 from attaining unity power factor. Characteristics of the control scheme 214 of FIG. 2A can be shown mathematically. For example, the carrier signal 220 for one switching period can be expressed as:

$$V_C(t) = V_m\left(\frac{t}{T_s}\right), \tag{1}$$

where $V_m$ is a voltage error of the output of the bridgeless PFC circuit, and $T_s$ is the switching period of the carrier signal. During switch conduction time, the inductor current is the same as switch current and inductor current information is not required after determining the duty cycle. Thus, switch current $I_s(t)$ is sensed through resistor $R_s$ and sensing gain $G_{DC}$, and a sensing voltage $V_s(t)$ is expressed as:

$$V_s(t) = V_m - I_s(t) R_s G_{DC}. \tag{2}$$

The controller terminates the conduction of the switch when the carrier signal $Vc(t)$ reaches the sensing voltage $Vs(t)$ as, $$V_m\left(\frac{t}{T_s}\right) = V_m - I_S(t) R_s G_{Dc} \tag{3}$$

If this occurs at time t, $t/T_s$ is the duty cycle D of the switch, and Eq. 3 becomes, $$V_m(1-D) = I_p R_s G_{DC}, \tag{4}$$

where $I_p$ is peak inductor current at the end of the switch conduction time.

The voltage gain of the boost converter is given by:

$$V_o/V_i = 1/(1-D), \tag{5}$$

and thus, $$(1-D) = V_i/V_o. \tag{6}$$

Eq. 6 illustrates that (1−D) is proportional to the input waveform. Solving for $I_p$ in Eq. 4 gives, $$I_p = V_m(1-D)/(R_s G_{DC}) = V_m(V_i/V_o)/(R_s G_{DC}) \tag{7}$$

Eq. 7 illustrates that $I_p$ is also proportional to the input voltage. Thus, for a sinusoidal input voltage waveform and a fixed output voltage, the peak current $I_p$ of each switching cycle forms a sinusoidal waveform that is in phase with the input voltage waveform.

Meanwhile, the average inductor current $I_{avg}$ for each switching cycle in steady state is the average of the maximum and minimum currents, which is the same as the inductor current at half of the switch conduction time. Since the ripple of inductor current is $$\Delta I_L = V_i(DTs)/L, \tag{8}$$

where L is the inductor value. The average inductor current can be expressed as $$I_{avg} = I_p - \Delta I_L/2 = I_p - V_i(DTs)/(2L) \tag{9}$$

Combining (6), (7) and (9) yields $$I_{avg} = V_m(V_i/V_o)/(R_s G_{DC}) - V_i(V_o-V_i)/V_o Ts/(2L) \tag{10}$$

The first term of (10) is proportional to sinusoidal input $V_i$. Meanwhile the second term has $V_i(V_o - V_i)$ which introduces distortion. The second term of Eq. 10 can be very small with large inductance value (L). However, in practical applications, this large inductance value is difficult to achieve. Consequently, $I_{avg}$ is not proportional to the input voltage $V_i$, and thus, the $I_{avg}$ waveform introduces distortion and harmonics that limit the circuit of FIG. 2A from attaining unity power factor in practical applications with reasonable inductance values.

Figure 3:
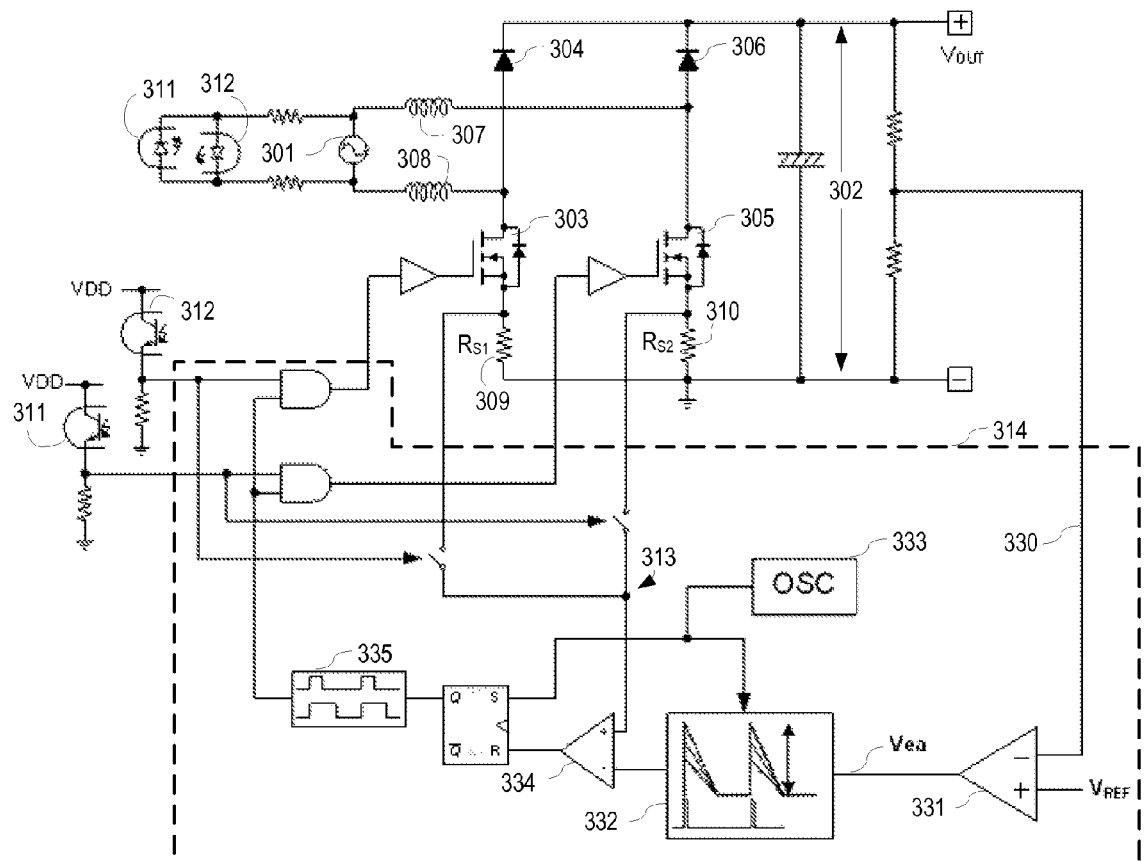
FIG. 3 illustrates generally a bridgeless power factor correction circuit with a control circuit according to one example of the present subject matter.

FIG. 3 illustrates generally a bridgeless PFC circuit 300 with a control circuit 314 according to one example of the present subject matter. The bridgeless PFC circuit 300 can include first and second input inductors 307, 308 configured to couple to an AC input 301, and a first switch 303 and a first diode 304 coupled in parallel with a second switch 305 and a second diode 306 to form a DC bus 302. Typically, one of the first switch 303 or the second switch 305 is switched "on" to initiate current in the first or second input inductors 307, 308. When the first switch 303 is "off", current flowing in the first and second inductors 307, 308 is used to boost the voltage of the DC bus 302 by redirecting the current flow to the load and using the body diode of the second switch 305 to complete the circuit.

In certain examples, the first and second switches 303, 305 can include metal oxide field effect transistors (MOSFETS). It is understood that other types or other numbers of switches are possible without departing from the scope of the present subject matter.

In an example, the control circuit 314 can be configured to control the average inductor current during each switching cycle such that the average inductor current waveform is proportional to the input voltage waveform. In certain examples, this control can provide substantially unity power factor and can minimize harmonics for sinusoidal input voltage waveforms. The control circuit 314 can include an output selectively coupled to the control input of each the first and second switches 303, 305 of the bridgeless PFC circuit 300. The control circuit 314 can include first or second sampling resistors $R_{s1}$ (309), $R_{s2}$ (310) configured to provide a voltage $V_{Rsi}$ at node 313 proportional to the conduction current of the respective first or second switches 303, 305. The conduction current of each of the first or second switches 303, 305 can be indicative of the inductor current of the bridgeless PFC circuit 300. The control circuit 314 can include an input signal 330 proportional to the output voltage 302 of the bridgeless PFC circuit 300.

In certain examples, the control circuit 314 can also include an output voltage comparator 331, a carrier signal generator 332, a clock 333, an inductor current comparator 334, and a pulse extender 335. The bridgeless PFC circuit 300 can include first and second opto-couplers 311, 312 to sense the polarity of the AC input 301 and to selectively couple and decouple control circuit inputs and outputs based on the sensed polarity In an example, the control circuit 314 can be configured to generate a carrier signal (e.g., using the carrier signal generator 332) configured to initiate current conduction in the first and second switches 303, 305 of the bridgeless PFC circuit 300. Further, in certain examples, the control circuit 314 can determine a duty cycle of the first and second switches 303, 305, where each switching cycle can produce an average inductor current waveform proportional to the input voltage waveform. Such a waveform can provide substantially unity power factor and can reduce harmonics over prior bridgeless PFC circuit control schemes.

In certain examples, an input to the carrier waveform generator 332 can include information related to error $V_{ea}$ in the output voltage $V_{OUT}$ of the bridgeless PFC circuit 300. Sampled output voltage can be compared to a reference to provide the error information $V_{ea}$ and the error information $V_{ea}$ can be provided to the carrier waveform generator 332. In an example, the error information $V_{ea}$ can include a voltage $V_m$ indicative of an output voltage error. In various examples, an initial voltage of the carrier signal can be $V_m$. In certain examples, the carrier signal can include a value that can decrease over time. In various examples, the carrier signal can decrease from an initial voltage related to $V_m$ to zero over a fraction of the switching cycle of the control circuit (e.g., ½ of the switching cycle, ¼ of the switching cycle, etc.). It is understood that other fractions of the switching cycle are possible for the ramp of the carrier signal to be constrained without departing from the scope of the present subject matter.

For a sinusoidal input voltage, the change in current over the conduction period of the switch is substantially linear. Accordingly, controlling the current at the midpoint of the conduction time of the switching period can control the average current of the first and second inductors of the bridgeless PFC circuit 300.

In an example, as the carrier signal is decreased from the initial voltage (e.g., $V_m$, etc.) to zero, it can cross a different, increasing, signal, such as a signal indicative of the conduction current of the bridgeless PFC circuit 300. In an example, an inductor current comparator 334 can compare the carrier signal to a voltage $V_{Rsi}$ indicative of the current flowing through the particular switch coupled to resistor $R_{si}$, where i denotes, in the illustrated example, either the first or second switch 303, 305. The switch voltage $V_{Rsi}$ can be proportional to the conduction current of the respective first or second switch 303, 305 of the bridgeless PFC circuit 300. For clarity, the beginning of the switching cycle can be the point at which the carrier signal is at its maximum voltage. In various examples, the output of the inductor current comparator 334 can assume a first state when the carrier signal voltage is higher than the switch voltage $V_{Rsi}$. The respective first or second switch 303, 305 corresponding to the switch voltage $V_{Rsi}$ can turn "on" when the carrier signal is higher than the switch voltage $V_{Rsi}$, or other voltage indicative of the conduction current of the first or second switch 303, 305. When the switch is "on", current through the switch can begin to increase. In turn, the switch voltage $V_{Rsi}$ across the associated sample resister $R_{si}$ can ramp up with the increasing inductor current. The output of the inductor current comparator 334 can assume a second state when the switch voltage $V_{Rsi}$ becomes greater than the carrier signal voltage and can remain at the second state for the remainder of the switch cycle period. Thus, in an example, the inductor current comparator output can transition between states when the increasing switch voltage $V_{Rsi}$ is substantially equal to the decreasing carrier signal value. The output of the inductor current comparator 334 can be coupled to a pulse extender 335.

The pulse extender 335 can be programmed to delay a transition of an output of the pulse extender based on a transition of a signal present at the input to the pulse extender 335. In an example, the pulse extender 335 can be configured to provide a delay inversely proportionate to the fraction of the switch period that the carrier signal is not zero. For example, where the carrier signal is configured to ramp from an initial voltage to zero over ½ of the switching period $T_s$, the pulse extender 335 can be programmed to ×2, or double, the pulse length of the inductor current comparator 334 signal (e.g., to ensure control at the average inductor current and not at a maximum or other point, etc.). In such an example, the pulse output from the pulse extender 335 can be twice as long in duration as the pulse generated by the inductor current comparator 334. In another example, where the carrier signal is configured to ramp from an initial voltage to zero over ¼ of the switching period $T_s$, the pulse extender 335 can be programmed to ×4, or quadruple, the pulse length of the inductor current comparator 334 signal (e.g., to ensure control at the average inductor current and not at a maximum or other point, etc.). In other examples, other relationships can be used, such as if the carrier signal period were ⅙ of the switching period $T_s$, then the pulse extender 335 could extend the inductor current comparator 334 signal ×6, or if the carrier signal period were ⅔ of the switching period $T_s$, then the pulse extender 335 could extend the inductor current comparator 334 signal ×3/2, etc.

In an example, the output of the pulse extender 335 can be selectively coupled to either of the first or second switches 303, 305 of the bridgeless PFC circuit 300. The control scheme described above can provide an average current waveform that is in phase with, and proportional to, the input voltage waveform, thus providing substantially unity power factor at the input and reduced harmonics compared with the peak current control method and apparatus described above.

For example, mathematically, the carrier signal of a bridgeless PFC circuit according to an example of the present subject matter can be represented by a voltage $V_c(t)$ during one switching cycle as:

$$V_c(t) = V_m(1 - 2t/T_s), \quad (9)$$

where $V_m(t)$ is a voltage indicative of a voltage output error of the bridgeless PFC circuit and $T_s$ is the switching period of the control circuit. As before, the inductor current is sampled using a sampling resistor $R_{si}$ to produce a switch voltage $V_{rsi}(t) = I(t)R_{si}$. The carrier waveform voltage $V_c(t)$ equals the switch voltage $V_{rsi}(t)$ at a time $T_x$. However, the switch controlled by the circuit during the switching cycle is left "on" for a period equaling $2T_x$. Thus, $T_x$ is half of the duty cycle duration and can be written as $DT_s/2$. At time $t=DT_s/2$, $$V_c(DT_s/2) = V_m(1 - 2(DT_s/2)/T_s) = V_m(1-D) = I(DT_s/2)R_s \quad (10)$$

Because the switch is left "on" for twice as long as the time interval from t=DTs/2, and the increase in current is substantially linear, I(DTs/2) represents the average inductor current $I_{avg}$ during the switching cycle. Thus, $$I_{avg} = V_m(1-D). \quad (11)$$

Recall from above that the gain of the bridgeless boost PFC circuit is, $$V_o/V_i = 1/(1-D), \quad (12)$$

this can be rewritten such that, $$(1-D) = V_i/V_o. \quad (13)$$

Combining equations 11 and 12, $$I_{avg}R_s = V_m(V_i/V_o). \quad (14)$$

Eq. 14 shows that the average inductor waveform produced by the average inductor currents during each switching cycle is proportional to the input voltage waveform. Consequently, for a sinusoidal voltage input, the illustrated control circuit 314 can maintain a sinusoidal average inductor current in the bridgeless PFC circuit 300 resulting in an improved power factor and reduced current waveform harmonics.

Figure 4:
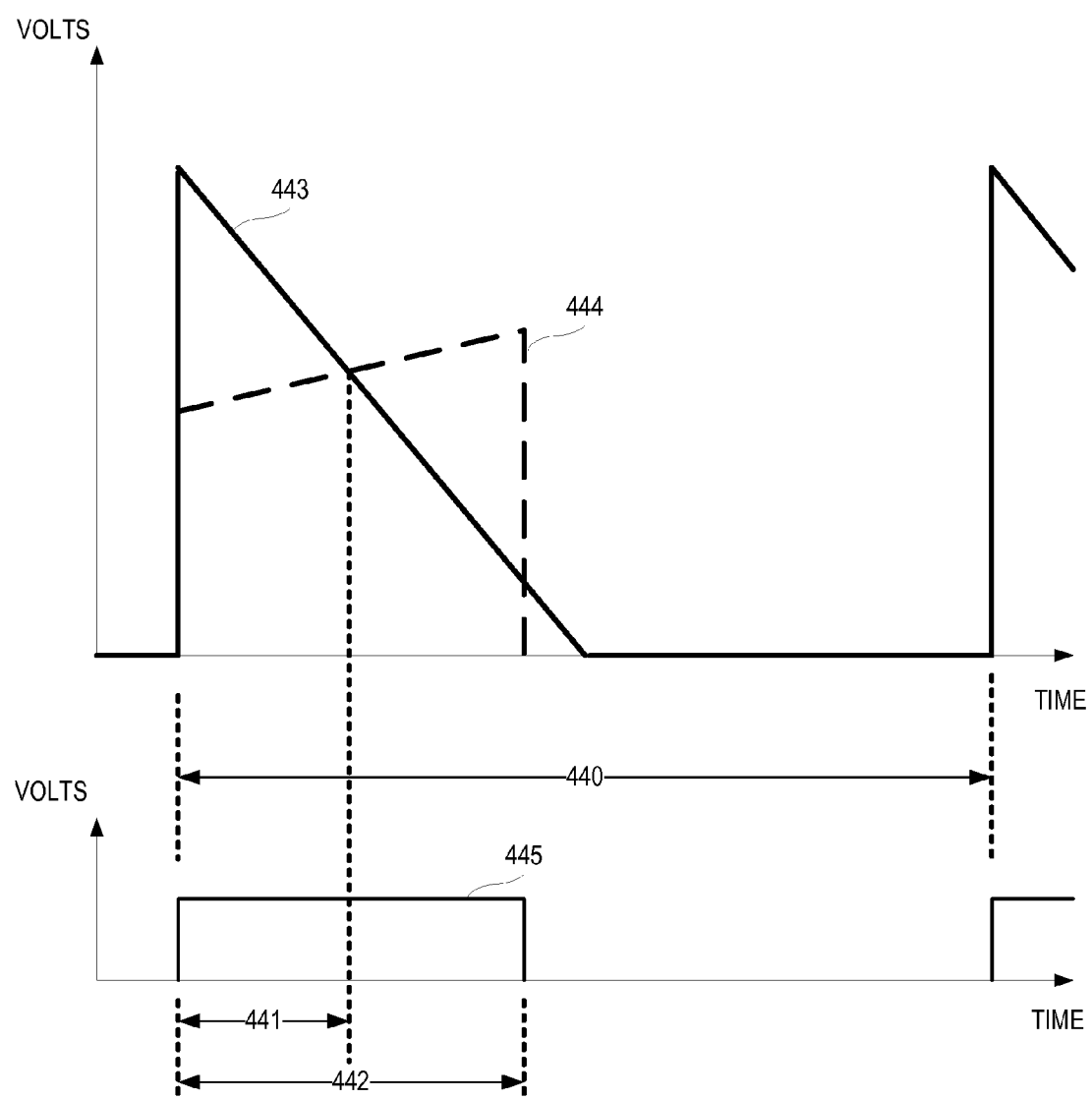
FIG. 4 illustrates generally a gate control pulse generated using the control scheme of FIG. 3.

FIG. 4 illustrates generally a gate control pulse generated using the control scheme of FIG. 3. FIG. 4 includes input waveforms to the current comparator 334 and a control pulse to either a first or second selected switch 303, 305. FIG. 4 includes the carrier waveform 443 generated at the carrier waveform generator. The maximum value of the carrier waveform is determined using the error information $V_{ea}$ of the output voltage $V_{OUT}$ of the bridgeless PFC circuit 300. FIG. 4 also shows the sampled voltage waveform 444 indicative of the increasing inductor current of the bridgeless PFC circuit 300. The sampled voltage waveform is generated using the sampling resistors $R_{S1}$ 309 and $R_{S2}$ 310. FIG. 4 also shows the gate control pulse 445 of the selected switch 303, 305. In the example of FIG. 4, the carrier signal is configured to decrease from a maximum value to zero over approximately half of the switching interval 440 and then remain at zero for the rest of the switching interval 440. The gate pulse interval 442 for the selected switch 303, 305 is configured to be twice as long as the interval 441 from when the carrier signal assumes its maximum value to the point at which the waveform indicative of the increasing inductor current 444 crosses the decreasing carrier signal waveform 443.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A bridgeless power factor correction circuit configured to couple to an alternating current source and a direct current load, the circuit comprising:
   a first transistor configured to control first current flow through a first inductor coupled to the (AC) source;
   a second transistor configured to control second current flow through a second inductor coupled to the (AC) source;
   a control circuit configured to provide a switching cycle, to generate a carrier signal as a function of the switching cycle, to generate a first control signal for the first transistor, and to generate a second control signal for the second transistor;
   wherein the control circuit is configured to receive a first signal indicative of current through the first transistor, and to generate an duty cycle for the first transistor using a comparison of the first signal and the carrier signal;
   wherein the control circuit is configured to receive a second signal indicative of current through the second transistor, and to generate an duty cycle for the second transistor using a comparison of the second signal and the carrier signal;

wherein the control circuit is configured to initiate the carrier signal at the beginning of the switching cycle, wherein a carrier signal duration corresponds to a fraction of a duration of the switching cycle;

wherein the first transistor is configured to conduct the first current flow during a first polarity state of a voltage of the AC source; and wherein the second transistor is configured to conduct the second current flow during a second polarity state of the voltage of the AC source, the second polarity state indicative of a voltage polarity of the AC source that is opposite of the first polarity state.

2. The circuit of claim 1, wherein the carrier signal decreases from a first voltage to second voltage during the carrier signal duration.

3. The circuit of claim 1, including an opto-coupler circuit to sense the first polarity state of the AC source.

4. The circuit of claim 1, wherein the control circuit is configured to generate the first control signal for the first transistor, the first control signal including a duty cycle for the first transistor, the duty cycle determined using a time at which the carrier signal crosses the first signal indicative of current through the first transistor.

5. The circuit of claim 4, wherein a fraction of the duty cycle for the first transistor is an interval from the beginning of the switching cycle to the time at which the carrier signal crosses the first signal indicative of current through the first transistor.

6. The circuit of claim 5, including a pulse extender configured to provide the duty cycle for the first transistor using the interval.

7. The circuit of claim 1, wherein the carrier signal duration corresponds to one half of the switching cycle.

8. The circuit of claim 7, wherein the control circuit is configured to generate the first control signal for the first transistor, the control signal including a duty cycle for the first transistor, the duty cycle determined using a time at which the carrier signal crosses the first signal indicative of current through the first transistor.

9. The circuit of claim 8, wherein one half of the duty cycle for the first transistor is an interval from the beginning of the switching cycle to the time at which the carrier signal crosses the first signal indicative of current through the first transistor.

10. The circuit of claim 9, including a pulse extender configured to double the interval to provide the duty cycle for the first transistor.

11. A method to improve power factor correction using a bridgeless power factor correction circuit, the method comprising:

generating a switching cycle of the power factor correction circuit;

generating a carrier signal to initially turn on a first switch of the bridgeless power factor correction circuit, wherein generating the carrier signal includes:

initiating a ramp of the carrier signal at a first voltage related to a difference between a DC output voltage of the bridgeless power factor correction circuit and a first reference voltage; and ramping the carrier signal to a second reference voltage over a first interval, the first interval equivalent to a fraction of the switching cycle of the power factor correction circuit;

initiating current conduction through the first switch of the power factor correction circuit using a comparison of the carrier signal and a voltage indicative of the current conduction;

sensing a first switch interval from the initiation of the current conduction to a time when the carrier signal equals the voltage indicative of the current conduction; and terminating the current conduction through the first switch after a second switch interval, the second switch interval measured from the initiation the current conduction;

wherein the second switch interval is a multiple of the first switch interval; and wherein the multiple is related to the fraction of the switching cycle.

12. The method of claim 11, wherein initiating current conduction through the first switch includes determining a first polarity state of an AC source coupled to the power factor correction circuit.

13. The method of claim 11, wherein the ramping the carrier signal includes ramping the carrier signal to a second reference voltage over a first interval, the first interval equivalent to about one half of the switching cycle of the power factor correction circuit.

14. The method of claim 13, wherein the terminating the current conduction through the first switch includes terminating the current conduction through the first switch after the second switch interval;

wherein the second switch interval measured from the initiation the current conduction; and wherein the second switch interval is twice as long as the first switch interval.

15. The method of claim 11, including:

initiating current conduction through a second switch of the power factor correction circuit using a comparison of the carrier signal and the voltage indicative of the current conduction through the second switch;

sensing a third switch interval from the initiation of the current conduction through the second switch to a time when the carrier signal equals the voltage indicative of the current conduction through the second switch;

terminating the current conduction through the second switch after a fourth switch interval;

wherein the fourth switch interval measured from the initiation of the current conduction through the second switch; and wherein the fourth switch interval is the multiple of the third switch interval.

16. The method of claim 15, wherein the ramping the carrier signal includes ramping the carrier signal to a second reference voltage over a first interval, the first interval equivalent to about one half of the switching cycle of the power factor correction circuit.

17. The method of claim 16, wherein the terminating the current conduction through the second switch includes terminating the current conduction through the second switch after a fourth switch interval;

wherein the fourth switch interval is measured from the initiation the current conduction through the second switch; and wherein the fourth switch interval is twice as long as the third switch interval.

18. The method of claim 15, wherein the initiating current conduction through the first switch includes determining a first polarity state of an AC source coupled to the power factor correction circuit.

19. The method of claim 18, wherein the initiating current conduction through the second switch includes determining a second polarity state of the AC source coupled to the power factor correction circuit.

* * * * *